(12) United States Patent
Norddahl

(10) Patent No.: US 6,368,849 B1
(45) Date of Patent: *Apr. 9, 2002

(54) METHOD AND PLANT FOR THE TREATMENT OF LIQUID ORGANIC WASTE

(75) Inventor: Birgir Norddahl, Ringe (DK)

(73) Assignee: Bioscan A/S, Odense M (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,347

(22) PCT Filed: Feb. 20, 1998

(86) PCT No.: PCT/DK98/00069

§ 371 Date: Mar. 3, 1999

§ 102(e) Date: Mar. 3, 1999

(87) PCT Pub. No.: WO99/42423

PCT Pub. Date: Aug. 26, 1999

(51) Int. Cl.[7] ............................. C05F 7/00; C12P 5/00; C02F 3/28
(52) U.S. Cl. .................... 435/262; 435/300.1; 435/166; 71/10; 48/127.7; 48/197 A; 210/603
(58) Field of Search ................................. 435/262, 243, 435/286.5, 166, 286.6, 289.1, 290.1, 300.1, 801; 210/603, 614, 631; 71/8, 10; 48/127.3–127.7, 197 A

(56) References Cited

U.S. PATENT DOCUMENTS 3,489,169 A * 1/1970 Stein
3,724,225 A * 4/1973 Mancini et al.
3,990,867 A * 11/1976 Baron et al.
4,468,463 A * 8/1984 Arsovic
4,710,300 A * 12/1987 Kristoufek
4,765,900 A * 8/1988 Schwoyer et al.
5,702,572 A * 12/1997 Fujimura et al.

FOREIGN PATENT DOCUMENTS

DE 39 01 404 * 8/1989

(List continued on next page.)

OTHER PUBLICATIONS

Database WPI, Section Ch, Week 9821 Derwent Publications Ltd., London GB (1998).
Leaflet (dated Oct. 1997) entitled "BIOREK® Separation Plant for Liquid Manure Sandager Skovgaard".
Leaflet (undated) entitled BIOREK®.
Newsletter (dated Nov. 06, 1997) from Bioscan A/S.
Bakos Et Al. Derwent Abstract No. 1984–184430 of HU 32008, Jun. 1984.*

*Primary Examiner*—William H. Beisner
(74) *Attorney, Agent, or Firm*—Birch, Stewart, Kolasch & Birch, LLP

(57) ABSTRACT

A method and plant for the treatment of an organic waste material in liquid form, e.g. liquid manure from livestock, the method comprising filtering fibres and particles from the liquid, subjecting the liquid to anaerobic fermentation in a biogas reactor, separating a substantially sterile and particle-free permeate stream from the biogas reactor, e.g. using ultrafiltration, subjecting the permeate stream to treatment with an ammonia stripper at an elevated temperature and preferably at reduced pressure to remove substantially all ammonia and carbon dioxide and to result in an ammonia fraction and a nutrient salt fraction, and separating the nutrient salt fraction into a fertiliser concentrate fraction and a water fraction, e.g. using reverse osmosis. The end products of the method are clean water, ammonia concentrate, fertiliser concentrate containing salts of P and K, compost and high-quality biogas with a high methane content.

38 Claims, 3 Drawing Sheets

FOREIGN PATENT DOCUMENTS

| | | | |
|---|---|---|---|
| DE | 4341713 | | 6/1995 |
| DK | 9500113 | | 5/1995 |
| EP | 0 029 536 | * | 6/1981 |
| EP | 0498337 | | 8/1992 |
| EP | 0565176 | | 10/1993 |
| FR | 2576741 | | 8/1986 |
| JP | 59-160597 | * | 9/1984 |
| JP | 61-185399 | * | 8/1986 |
| JP | 04-087698 | * | 3/1992 |
| JP | 7-148500 A | * | 7/1995 |
| JP | 08-173993 | * | 7/1996 |
| WO | 9822393 | | 5/1998 |

\* cited by examiner

METHOD AND PLANT FOR THE TREATMENT OF LIQUID ORGANIC WASTE

This application is the national phase under 35 U.S.C. §371 of prior PCT International Application No. PCT/DK98/00069 which has an International filing date of Feb. 20, 1998 which designated the United States of America.

FIELD OF THE INVENTION

The present invention relates to a method and a plant for the treatment of organic waste materials in liquid form such as liquid manure from livestock production or sewage.

DISCUSSION OF THE PRIOR ART

In order to meet increasing world-wide demands for food, intensive livestock production has become more widespread in recent years, and this trend will undoubtedly continue in the future. While providing important benefits in terms of increased yield and a more efficient production process, intensive livestock production has negative environmental consequences due to the large amount of organic waste that is produced. Intensive production of pigs results in particular in a large amount of liquid manure that can represent a serious environmental problem if not treated and handled correctly. However, technologies have not been available in the past to treat this type of liquid organic waste in an environmentally and economically acceptable manner. As a result, the liquid manure from intensive livestock production has in many cases led to serious environmental problems, for example pollution of ground water by excess manure spread onto fields or otherwise allowed to leach into the ground.

Danish utility model No. DK 95 00113 U3 describes a plant for the treatment of liquid manure, in which the manure is converted to compost, fertilisers, water and biogas. The plant comprises 1) a filtration unit for separating fibrous and particulate material having a size of over 1 mm from the liquid and particles less than 1 mm, the fibrous material being e.g. used as compost, 2) a reactor for the production of biogas, 3) an ultrafiltration unit that retains bacteria and suspended organic material and returns such material to the biogas reactor, 4) a desulphurisation unit that removes hydrogen sulphide from the biogas before the biogas is used for the production of heat and power, 5) a reverse osmosis unit, in which the permeate stream from the ultrafilter is separated into a water fraction and a fertiliser concentrate fraction.

A separation plant for liquid manure referred to as BIOREK® is known from Bioscan A/S (Odense, Denmark). The BIOREK® plant is based on the plant described in DK 95 00113 U3 and further contains, between the ultrafiltration unit and the reverse osmosis unit, an ammonia stripper for the removal of ammonia and carbon dioxide from the permeate stream from the ultrafilter. The BIOREK® plant is described e.g. in a brochure, published October 1997, from Bioscan A/S entitled "BIOREK® separation plant for liquid manure, Sandager Skovgaard".

The present invention represents a further development of the technology known from DK 95 00113 U3 and from the BIOREK® plant, allowing surprisingly advantageous results to be obtained in the treatment of liquid manure and other liquid organic waste materials.

BRIEF DISCLOSURE OF THE INVENTION

One aspect of the present invention relates to a method for the treatment of an organic waste material in liquid form, comprising subjecting the liquid to anaerobic fermentation in a biogas reactor, separating a substantially sterile and particle-free permeate stream from the biogas reactor, subjecting the permeate stream to treatment with an ammonia stripper to result in an ammonia fraction and a nutrient salt fraction, and separating the nutrient salt fraction into a fertiliser concentrate fraction and a water fraction, wherein treatment of the permeate stream with the ammonia stripper is performed at an elevated temperature.

Another aspect of the invention relates to a plant for treatment of an organic waste material in liquid form, comprising a biogas reactor, means for separating a substantially sterile and particle-free permeate stream from liquid in the biogas reactor, an ammonia stripper for separating the permeate stream into an ammonia fraction and a nutrient salt fraction, and means for separating the nutrient salt fraction into a fertiliser concentrate and a water fraction, wherein the ammonia stripper includes a heating means for heating the permeate stream.

A further aspect of the invention relates to a method for producing biogas enriched in methane, the method comprising subjecting an organic waste material in liquid form to anaerobic fermentation in a biogas reactor, wherein liquid from the biogas reactor is subjected to ultrafiltration to result in a permeate fraction enriched in carbon dioxide and a methane-enriched fraction, said methane-enriched fraction being returned to the biogas reactor to result in biogas having an increased methane content.

A still further aspect of the invention relates to methane-enriched biogas produced by this method.

DETAILED DESCRIPTION OF THE INVENTION

The method and plant of the invention are suitable for treatment of any aqueous organic waste material, including waste water from households, industry or agriculture, including sewage from institutions such as hospitals, as well as liquid manure from livestock production. As indicated above, the invention is particularly suitable for treating the liquid manure that results from intensive livestock production, e.g. intensive production of pigs. In the description below, reference will often be made for the sake of simplicity to liquid manure. It will be clear to persons skilled in the art, however, that the method and plant of the invention are equally applicable to other types of liquid organic waste material.

In a preferred embodiment of the invention the method and plant comprise the following parts:

1. Pre-treatment of the Liquid Waste Material

The liquid waste material to be treated in accordance with the present invention, e.g. liquid manure, will typically comprise not only liquid with a variety of organic and inorganic components dissolved therein, but also a certain amount of fibrous and/or particulate matter suspended therein. It is preferred that as much as possible of this fibrous and particulate material above a certain size be removed from the liquid before the liquid is subjected to anaerobic fermentation and subsequent steps in the process, as such larger particles will tend to interfere with ultrafiltration, etc., thereby reducing treatment efficiency and increasing costs. The liquid waste material is therefore typically filtered to remove larger fibres and particles, optionally after having been treated with a macerator, whereby material with a particle size of more than about 1 mm is removed. The filter mass comprising the fibres and particles that have been filtered off can then be pressed to remove excess liquid, and this liquid, together with the liquid fraction from the filtration process (containing particles of e.g. less than about 1 mm) can then be combined and subjected to anaerobic fermentation in the biogas reactor.

It is preferred, however, that the liquid resulting from the filter pre-treatment is not added directly to the biogas reactor, but rather to a buffer tank. In addition to being advantageous by providing a supply of liquid from which liquid to be treated can be transferred as needed to the biogas reactor, in order to maintain a suitable load in the biogas reactor, the buffer tank also serves to allow particles such as sand particles, which are undesired in the subsequent treatment process, to sediment, while suspended organic particles are led, together with the liquid, to the biogas reactor.

2. Anaerobic Fermentation

From the buffer tank, liquid manure or other liquid waste material is led to the biogas reactor, in which anaerobic fermentation takes place. Although the residence time in the biogas reactor will vary depending on such factors as the nature of the waste material, the organic matter content, the bacteria mix present and the temperature of the liquid, it has been found that for liquid manure from pigs, a residence time of about 1–7 days, e.g. about 3–6 days, such as about 3–4 days, is generally suitable. The liquid to be treated is typically pumped into the reactor via an inlet in the lower part of the reactor, and an outlet is typically located slightly below the liquid surface. The bottom of the reactor vessel is preferably conical, thereby allowing any sedimented particles or sludge to be removed as necessary via an outlet at the bottom. The level of liquid in the reactor may be regulated e.g. by means of a pressure gauge at or near the bottom of the reactor vessel, the pressure gauge being functionally connected to a valve, e.g. placed downstream of the ultrafiltration unit, that automatically allows permeate to be returned to the reactor vessel as necessary in order to maintain a desired level of liquid in the reactor.

Although it is possible to stir the contents of the reactor, this will not normally be required, since, in a preferred embodiment, the reactor will be designed so as to automatically provide a suitable flow of liquid within the reactor, thus providing sufficient mixing of the contents. Typically, this will take place as a result of the liquid inlet being at the bottom of the tank, while the liquid outlet is near the upper surface of the liquid. The tank itself is preferably designed, taking into consideration Stoke's law, to result in a flow that allows heavier particles, in particular inorganic particles such as clay particles, to sediment, while lighter particles, in particular particles of organic matter, remain suspended.

The temperature in the reaction vessel can be varied as desired, but will typically be suitable for mesophilic bacteria, e.g. in the range of about 20–40° C., e.g. about 30–40° C. In many cases, a temperature of about 35–37° C. will be most advantageous. If appropriate, depending on the type of bacteria present, the use of higher or lower fermentation temperatures is of course possible. For most purposes, including the treatment of liquid manure, the bacteria responsible for the anaerobic fermentation will simply be those bacteria that are naturally present in the liquid waste in question. However, it is also contemplated that it may in some cases be advantageous to supplement the native bacteria by adding one or more desired bacteria cultures to the biogas reactor or to the liquid.

It is of course important that the biogas reactor be designed to have a suitable size for the intended type and amount of liquid waste to be treated. Aside from the fact that this results in optimal fermentation, it is also important that organic components in the reactor are degraded sufficiently to avoid fouling of the ultrafilter with protein or fat. When the waste material being treated is liquid manure from livestock, the organic load in the biogas reactor is thus preferably below about 10 kg volatile solids per cubic meter per day, e.g. not more than about 8 kg volatile solids per cubic meter per day, preferably not more than about 5 kg volatile solids per cubic meter per day. However, for other types of liquid wastes, the load in the reactor (kg $VS/m^3/d$, determined according to DS 207:1985 as loss on ignition at 550° C. for 1 hour) may be greater. For example, it is believed that a load of about up to about 20 kg $VS/m^3/d$ will be suitable when treating distillery waste, because the content of sugar and alcohol in such waste enhances the fermentation process.

Biogas produced by the fermentation is removed from the reactor via an outlet at or near the top of the reactor vessel. In a further preferred embodiment, when the biogas contains hydrogen sulphide, the gas, typically after having been mixed with air, is subjected to a desulphurisation process to remove the hydrogen sulphide. The desulphurisation process may be performed using known methods, e.g. using ochre ore filters, iron filing filters, iron hydroxide filters, bark filters or the Sulphint® wash process. The resulting biogas contains predominately methane and some carbon dioxide, and only very small amounts of other gasses, and is therefore highly suitable for use in e.g. gas motors or generators for the production of heat and/or power. This is explained in more detail below in connection with the discussion of the ultrafiltration step.

3. Ultrafiltration

As mentioned above, a substantially sterile and particle-free permeate is separated out of the liquid in the biogas reactor, preferably by means of a membrane separation technique, in particular by means of ultrafiltration. In a preferred embodiment, the fraction retained by the ultrafilter, containing bacteria and suspended organic material, is returned to the biogas reactor, e.g. by being added to untreated waste liquid being pumped to the reaction vessel from the buffer tank. By leading this fraction back to the reaction vessel, an improved degradation of the organic components is obtained, as well as an enhanced fermentation, since bacteria which are active in the fermentation process are returned to the reactor. As explained above, permeate exiting the ultrafiltration unit can in addition be used to help regulate the liquid level in the reactor vessel. For this reason, it is preferred that the capacity of the ultrafiltration unit is larger than that which is strictly necessary with regard to the daily flow of liquid into the reactor and the corresponding flow of permeate exiting the ultrafilter for further treatment. The flow of liquid into the reactor vessel can thus be regulated by means of a combination of 1) liquid with a high organic matter content entering from the buffer tank, combined with a certain amount of liquid being returned from the ultrafiltration unit to the reactor, and 2) permeate from the ultrafiltration unit. This allows both the volume of liquid in the reactor and the organic matter content in the liquid to be "fine-tuned", so that the anaerobic fermentation process can be optimised to any given set of conditions.

In a particularly preferred embodiment, ultrafiltration is performed using a tubular ultrafiltration membrane. The membrane typically has a cut-off of about 10,000–30,000 Dalton, preferably about 15,000–25,000 Dalton, e.g. about 20,000 Dalton, and a diameter of about 5–30 mm, e.g. about 5–25 mm, e.g. about 8–20 mm, such as about 10–15 mm. A non-limiting example of such a tubular ultrafiltration membrane system is as follows:

The ultrafilter is composed of a number of modules of equal size, the number of modules in a given system being determined according to the size of the treatment plant. Each module consists of a 19 meter long tube with an inner diameter of 12.5 mm. The tube is bent in such a fashion that it fits into an a shell of aluminium, having a length of 3 meters, encapsulating the membrane tube and sealed at each end by a watertight epoxy seal. The ultrafilter membrane is fixed to the inner side of the tube and is of the asymmetric, polysulphone, cross-flow type with a mean molecular weight cut-off of 20,000 Dalton, meaning that only molecules with a mean molecular weight of less than about 20,000 amu (atomic mass units) can pass the membrane. The fraction retained by the ultrafilter is pumped through the filter tube at a pressure of about 4–6 bar and a velocity of about 1.5–2.0 m/s, creating a turbulent flow through the tube. This turbulent flow is characteristic of cross-flow filtration. The filter modules are normally arranged in a parallel flow path, which in the case of treatment of 40 m/day of waste such as liquid manure means about 60 modules with a recirculation flow through the filter of about 50–70 m$^3$/hour. The permeate passing through the filter membrane is collected in the aluminium shell encapsulating the filter tube and led from here to an intermediate permeate tank, from which it can either be pumped back to the reactor in order to maintain a desired level of liquid in the reactor or pumped to a storage tank upstream from the ammonia stripper.

The flow of liquid through the ultrafiltration unit will typically correspond to a flow that allows a volume corresponding to the entire reactor content to pass through the ultrafiltration unit in a few hours. For example, for a reactor vessel with a volume of 240 m$^3$, a volume of about 50–70 m$^3$/h may pass through the ultrafiltration unit. From this volume, a relatively small amount will exit the ultrafiltration unit as substantially sterile, particle-free permeate, while the remainder, containing bacteria and suspended organic particles, will be recirculated to the reactor. If 40 m$^3$/day of permeate is led on to the next stage of the process, the residence time will be 6 days on average in this case.

An important advantage of the method and plant of the invention is that it has surprisingly been found that the biogas produced in this manner has an unusually high content of methane and a correspondingly low content of carbon dioxide compared to biogas produced by traditional methods. Thus, while biogas normally has a methane content of not more than about 65% by weight and a carbon dioxide content of at least about 35% by weight, it has been found that biogas produced according to the present invention typically has a methane content of about at least about 70% by weight, e.g. at least about 75% by weight, for example a methane content of about 75–80% by weight and a carbor dioxide content of only about 20–25% by weight. This is believed to be associated with the fact that carbon dioxide has a higher solubility in the water phase than methane at a higher pressure, in accordance with the pressure swing absorption process (PSA process) for separating carbon dioxide out of a carbon dioxide/methane mixture. This results in a separation mechanism in the ultrafiltration membrane, allowing a substantial fraction of the carbon dioxide to be transported across the membrane compared to the amount of methane transported across the membrane. Consequently, liquid returned from the ultrafiltration unit to the bioreactor is enriched in methane.

This high methane content is a great advantage especially when the biogas is to be used in gas motors, since a low methane content (e.g. as found in conventional biogas) makes it difficult to properly regulate the gas/air mixture. The high methane content of the biogas produced according to the present invention, on the other hand, means that correct carburation is not as critical, and the result is a smoother and more economical operation of the motor. In effect, the invention results in biogas with a quality close to that of natural gas.

4. Ammonia Stripper

Although the permeate from the ultrafiltration unit can, in principle, be treated directly in a reverse osmosis unit, in practice this leads to significant difficulties in the reverse osmosis due to a rather high concentration of ammonia and carbon dioxide in the permeate. According to the present invention, it has been found that effective removal of ammonia together with carbon dioxide is critical for the success and economical operation of the subsequent reverse osmosis step. Various methods and apparatuses for the removal of ammonia are known in the art, and while the precise nature of the ammonia stripper used is not critical, it has been found that a significantly improved result is obtained when the ammonia stripping step is performed at an elevated temperature, and optionally also under a partial vacuum. In particular, the effective removal of both ammonia and carbon dioxide from the permeate stream is important for the-subsequent reverse osmosis step, since insufficient removal of ammonia and carbon dioxide was found to result in deposits on the reverse osmosis membranes, such deposits ultimately requiring the plant to be shut down for repairs and possible replacement of the membranes, which in turn leads to greatly increased costs and reduced waste treatment capacity.

While not wishing to be bound by any theory, the improved results obtained when the ammonia stripping is performed with the application of heat are believed to be related to the following equilibrium equations for ammonia and carbon dioxide:

$$H^+ + HCO_3^- \leftrightarrows H_2CO_3 \leftrightarrows H_2O + CO_2$$

$$NH_4^+ \leftrightarrows NH_3 + H^+$$

With increased temperature, the equilibrium for carbonic acid/carbon dioxide is shifted to the right, i.e. towards release of gaseous carbon dioxide. This is accompanied by a decrease in the H$^+$ concentration, i.e. an increase in pH, which in turn shifts the ammonium/ammonia equilibrium to the right, i.e. towards conversion of dissolved ammonium to ammonia. Similarly, the conversion of ammonium to ammonia shifts the carbonic acid/carbon dioxide equilibrium towards conversion to carbon dioxide. Thus, the application of heat serves to improve the removal of both ammonia and carbon dioxide, and the effect can be further improved if the process is carried out under a partial vacuum.

The removal of ammonia is important for several reasons. One of these is the fact that removal of ammonium in the subsequent reverse osmosis step is relatively poor compared to many other inorganic salts. Thus, it will typically not be possible to remove more than about 90–95% of the ammonium ions by means of reverse osmosis, while reverse osmosis can, for example, remove about 99.5% of sodium ions present. As a result, if ammonia is not sufficiently removed by ammonia stripping, the "purified" water resulting from the reverse osmosis will contain an excessive amount of ammonia, i.e. an amount exceeding that allowed by relevant laws and standards. In addition, the removal of almost all of the ammonia (about 98–99%) provides the advantage of separating the ammonia from salts of phosphorus and potassium, which makes these end products more useful and valuable.

The removal of carbon dioxide is particularly important in that it leaves the permeate essentially free of bicarbonate ions that would otherwise result in damaging deposits of calcium and magnesium carbonate on the reverse osmosis filter. By removing the bicarbonate ions, the treatment process as a whole is made easier, cheaper and more reliable, and it is furthermore possible to obtain a larger overall capacity for the plant as a whole for a given reverse osmosis unit, or alternatively, to use a reverse osmosis unit with a smaller capacity than would otherwise be required.

Referring to the above discussion, ammonia stripping is typically performed at a temperature of at least about 40° C., preferably at least about 50° C., more preferably at least about 60° C., e.g. at least about 70° C. The permeate may also be boiled so that ammonia stripping is obtained by means of distillation. Optionally, a combination of heat and reduced pressure may be used, e.g. a pressure of about 0.25–0.75 bar, such as about 0.5 bar, and a temperature of about 65–85° C., such as about 70–80° C.

As indicated above, the ammonia stripping method itself is not critical, and various methods known in the art will be able to be adapted to the needs of the present invention. An example of a suitable method and apparatus is described in EP 0494154-A. In a preferred embodiment, heat and reduced pressure are both provided by a compression evaporator, the heat being provided by condensation of evaporated liquid.

As an alternative to the use of a combination of heat and reduced pressure, the removal of ammonia and carbon dioxide can also be obtained using heating alone, i.e. at atmospheric pressure. In this case, the permeate is simply heated to a temperature sufficient to distil off the ammonia and carbon dioxide. In a further preferred embodiment, the heat for this process can be provided by excess heat from the burning of the biogas to provide heat and power, e.g. from flue gas.

Since both ammonia and carbon dioxide are effectively removed from the permeate, they tend to form a salt that precipitates in the form of ammonium bicarbonate. However, this can be readily removed from the ammonia stripper, e.g. by means of a mechanical extraction method combined with a worm pump.

Since the removal of ammonia and carbon dioxide from the permeate is accompanied by an increase in pH, the nutrient salt fraction exiting the ammonia stripper typically has a pH value about 9–10. In the subsequent reverse osmosis step, a lower pH is desired in order to prevent deposits on the membrane of especially phosphates, and the pH of the nutrient salt fraction should therefore be reduced to below about 7.0 prior to the reverse osmosis step. Typically, the pH is adjusted to about 6.5. Any suitable acid may be used, in particular an inorganic acid such as phosphoric acid, nitric acid, hydrochloric acid or sulphuric acid. A preferred acid is phosphoric acid.

5. Reverse Osmosis

After having passed through the ammonia stripper, the permeate consists of a nutrient salt fraction in which essentially all ammonia and carbon dioxide has been removed, the pH of the nutrient salt fraction having been adjusted to a suitable level as described above. This nutrient salt fraction is then subjected to further purification using a membrane separation technique, in particular a reverse osmosis unit, which performs the final step in the treatment process, namely the separation of nutrient salts to result in a fertiliser concentrate fraction and a water fraction. The nutrient salts removed in this step are in particular salts of phosphorus and potassium, and the water that remains after the reverse osmosis step is clean, potable water that fulfils the WHO requirements for drinking water.

The reverse osmosis step is e.g. performed using a conventional spiral reverse osmosis membrane unit arranged in a tapered configuration. The membranes are e.g. of the polyamide brackish water type normally used for desalination.

The reverse osmosis may be either performed as a continuous process or a batch process. In a preferred embodiment, however, the reverse osmosis is performed as a fed batch process. This can for example take place using a concentrate tank, e.g. with a volume of about 2 $m^3$. At the beginning of a cycle, the concentrate tank is filled up with permeate which is pumped to the reverse osmosis membrane. Clean water is removed from the reverse osmosis unit, while permeate retained by the reverse osmosis membrane is returned to the concentrate tank for further processing. After a period of e.g. about 12–14 hours, the volume of concentrated permeate in the tank has been reduced to, e.g., about 20% of the original permeate volume. At this point, the concentrated permeate (fertiliser concentrate) is removed from the tank, which is then rinsed prior to the start of a new cycle.

The separation of the liquid manure or other liquid organic waste into the various end products (clean water, ammonia concentrate, P/K fertiliser concentrate, fibrous compost and biogas) according to the present invention results in a significant improvement in the utilisation of the various components in the waste material, and correspondingly a significant reduction of the environmental impact. In this way, it is in fact possible to recycle as much as 98–100% of the organic matter in liquid manure into useful products. Furthermore, the invention makes is possible to obtain significant improvements in the internal environment of stalls containing livestock, since the stalls can be designed for immediate removal of liquid manure. As a result, it is possible to essentially eliminate ammonia from such stalls, and the stalls can be constructed without any large-scale storage facilities for liquid manure, since the manure can be led out of the stall for substantially immediate treatment.

A further important advantage of the treatment plant described above is that it is designed to require very little maintenance.

This is in particular due to the fact the initial treatment steps prevent fouling of the ultrafilter, and that the effective removal of ammonia and carbon dioxide prevents fouling of the reverse osmosis membrane. The result is a significant improvement in the overall efficiency and economy of the treatment process, since regular shutdowns of the plant for the purpose of cleaning or replacing filters and membranes are largely eliminated.

In addition, since very little routine maintenance is required, the entire system is well-suited for automatic, computerised operation. For example, the fermentation process can be monitored by means of automatic measurements of volatile fatty acids, such measurements typically being performed downstream of the ultrafiltration unit, e.g. using an automatic titration process. The results of these measurements can then be used to automatically regulate the feed of untreated liquid waste into the reactor vessel, so as to maintain a desired organic matter content in the reactor and thus an optimum fermentation rate.

Another preferred embodiment of the invention, which is particularly suitable for the treatment of sewage from e.g. households, institutions or industry, comprises the following:

1. A coarse screen filter having openings of e.g. about 2–3 cm for removing relatively large objects from the sewage.

2. A pre-treatment filtration of the sewage to remove fibres and particles of a size of more than about 1 mm, i.e. corresponding to the pre-treatment described in more detail above.
3. A concentration tank connected to an ultrafiltration unit, wherein the ultrafiltration unit corresponds essentially to that described above, although typically using an ultrafiltration membrane with a larger pore size, e.g. having a mean molecular cutoff point of up to about 100,000 Dalton, such as from about 20,000 to about 100,000 Dalton, depending on the nature of the waste being treated. Ultrafiltration of liquid from the concentration tank typically results in a permeate volume of about 80% of the total volume of liquid added to the concentration tank, and a concentrate volume of about 20% of the total volume of liquid added to the concentration tank.

In this embodiment, anaerobic fermentation does not take place in the concentration tank, and as a result, the liquid subjected to ultrafiltration will contain a significant amount of macromolecular material (proteins and fat) that will tend to be collected on the ultrafilter membrane. The ultrafilter membrane will thus require cleaning at regular intervals, for example once a day, which typically takes about 4–6 hours. The concentration tank will therefore be designed so that it can hold a much larger volume than that which is actually present in the tank most of the time, thereby allowing the concentration tank to also function as a buffer tank into which liquid to be treated may flow during periods in which the ultrafiltration unit is not in operation due to cleaning of the ultrafilter membrane.

4. A first reverse osmosis unit for treatment of the permeate fraction from the ultrafiltration unit.
5. The concentrate fraction from the ultrafiltration unit is subjected to a treatment process substantially as described in more detail above, i.e. using a combination of a biogas reactor, an ultrafiltration unit and an ammonia stripper.
6. The permeate from the first reverse osmosis unit mentioned in (4) above is combined with the permeate (nutrient salt fraction) from the ammonia stripper mentioned in (5) above, this combined permeate being subjected to reverse osmosis. The reverse osmosis unit in this case is substantially as described in more detail above, but will typically be dimensioned to treat a much larger volume of liquid.

As an example, the concentration tank in this embodiment of the invention may have a size of e.g. about 200 m$^3$, suitable for daily treatment of about the same sewage volume. The volume of liquid in the concentration tank will generally be much less, however, e.g. about 50 m$^3$, with the exception of those periods during which the ultrafiltration unit is not in operation due to cleaning of the ultrafilter. In these periods, liquid will continue to flow into the concentration tank, so that the level of liquid rises significantly until the ultrafiltration unit again begins operating, at which point the amount of liquid in the tank will fall relatively quickly to the equilibrium level of e.g. about 50 m$^3$. Typically, about 80% of the total liquid volume added to concentration tank, or in this case about 160 m$^3$/d, will exit the ultrafiltration unit as permeate, while the remaining approximately 20%, i.e. about 40 m$^3$/d in this case, will be removed from the concentration tank for further processing using a biogas reactor, an ultrafiltration unit and an ammonia stripper as mentioned in (5) above.

The use of a concentration tank, in order to obtain a liquid waste with a higher organic matter content before the liquid is treated in the biogas reactor, is preferred for liquids having an initial organic matter content of less than about 0.5–1% by weight, while such a concentration step will not normally be performed when the organic matter content is above about 1% by weight.

DESCRIPTION OF THE DRAWINGS

In FIG. 1, the treatment plant comprises a collecting tank 2 for collecting liquid manure from livestock in a stall. A pump 4 pumps liquid manure from the collecting tank 2 to a filtration unit 6, which separates the liquid manure into a fibrous fraction 8 and a liquid fraction 10, which is collected in a buffer tank 12. From the buffer tank 12, liquid is transferred by means of a pump 14 to a biogas reactor 16, wherein anaerobic fermentation takes place. An outlet at or near the top of the reactor allows biogas 18 to be removed from the reactor. The biogas 18 is then preferably mixed with air and subsequently treated in a desulphurisation unit (not shown) to remove hydrogen sulphide. Liquid from the reactor 16 is transferred by means of a pump 20 to an ultrafiltration unit 22 that separates a substantially sterile and particle-free permeate stream from liquid in the reactor. A pressure gauge (not shown) is located at or near the bottom of the reactor 16, the pressure gauge being in contact with a valve 24 that allows part of the permeate 26 to be returned to the reactor 16 as necessary in order to regulate the level of liquid in the reactor. The remainder of the permeate 28 is led on to an ammonia stripper 30. Liquid 32 containing recirculated biomass (bacteria and suspended organic matter) retained by the ultrafiltration unit 22 is mixed with untreated liquid manure from the buffer tank 12 and returned to the reactor 16 for further treatment. Preferably, the liquid 32 first passes through a heat exchanger 34. The reactor 16 has an outlet 36 at the bottom through which sedimented particles and sludge can be removed. The ammonia stripper 30 separates the permeate into an ammonia fraction 38, containing almost all of the ammonia and carbon dioxide found in the permeate, and a nutrient salt fraction 40 containing water and dissolved salts of phosphorus and potassium. The nutrient salt fraction 40 is then subjected to reverse osmosis in a reverse osmosis unit 42, which results in a fertiliser concentrate fraction 44 comprising salts of P and K and clean water 46 of drinking water quality.

FIG. 2 shows schematically the result of processing 40 t/day of liquid manure slurry. As shown in the mass balance diagram, the 40 tons of liquid manure is filtered to result in 1.2 tons of compost and 38.8 tons of filtered slurry. Processing of the filtered slurry in the biogas reactor results in 880 Nm$^3$ of biogas, of which about 70% is methane. After ultrafiltration and ammonia stripping, the 38,8 tons of permeate result in about 1 ton of ammonia concentrate and about 38 tons of nutrient salt permeate. After reverse osmosis, the nutrient salt permeate is converted to 6.2 tons of P/K fertiliser concentrate and 31.6 tons of water. In the figure, VS=volatile solids, TS=total solids.

FIG. 3 shows the basic components of a treatment plant for the treatment of sewage. In this embodiment, the treatment plant comprises a coarse screen filter 2 for removing relatively large objects from the sewage. The sewage is then led to a pre-treatment filter 4 to remove fibres and particles of a size of more than about 1 mm and subsequently to a concentration tank 6, the concentration tank 6 being connected to an ultrafiltration unit 8 comprising a tubular ultrafiltration membrane. Permeate 10 from the ultrafiltration unit 8 is transferred to a first reverse osmosis unit 12 for further purification. Concentrate 14 from the concentration tank 6 is then subjected to a treatment 16 (details not shown) comprising a combination of a biogas reactor, an ultrafiltration unit and an ammonia stripper. The permeate 18 from the first reverse osmosis unit 12 is then combined with the permeate 20 from the treatment 16, this combined permeate being subjected to reverse osmosis in a second reverse osmosis unit 22.

Figure 1:
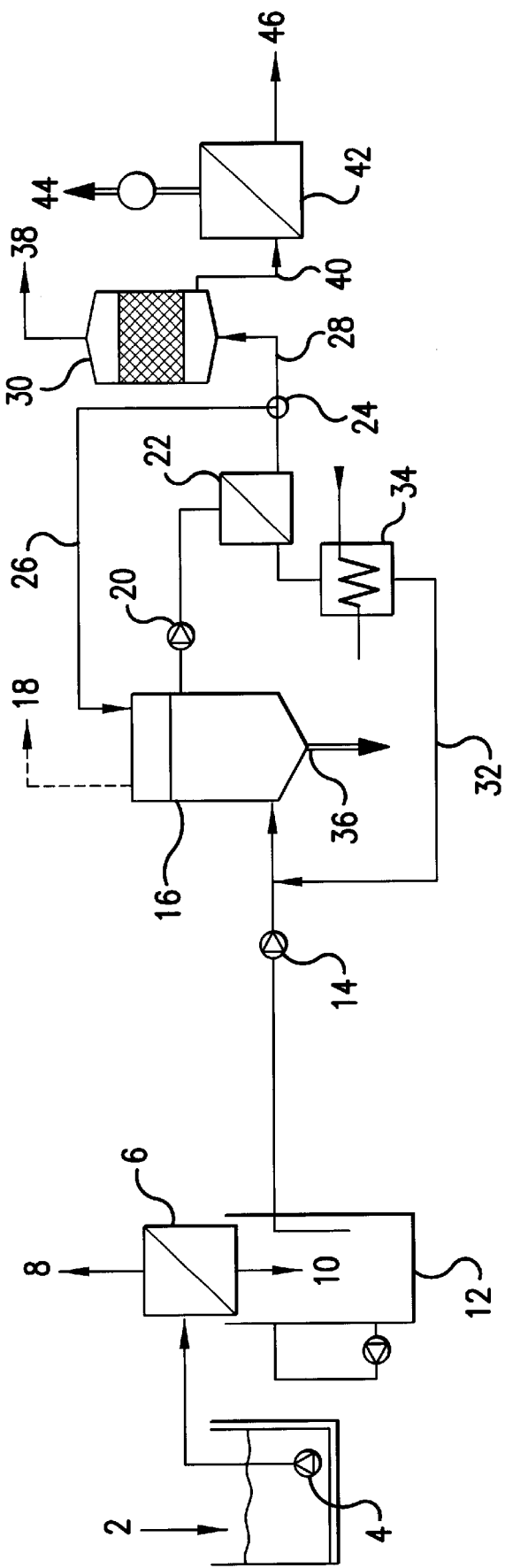
FIG. 1 shows the basic components of a preferred treatment plant according to the invention.
Figure 2:
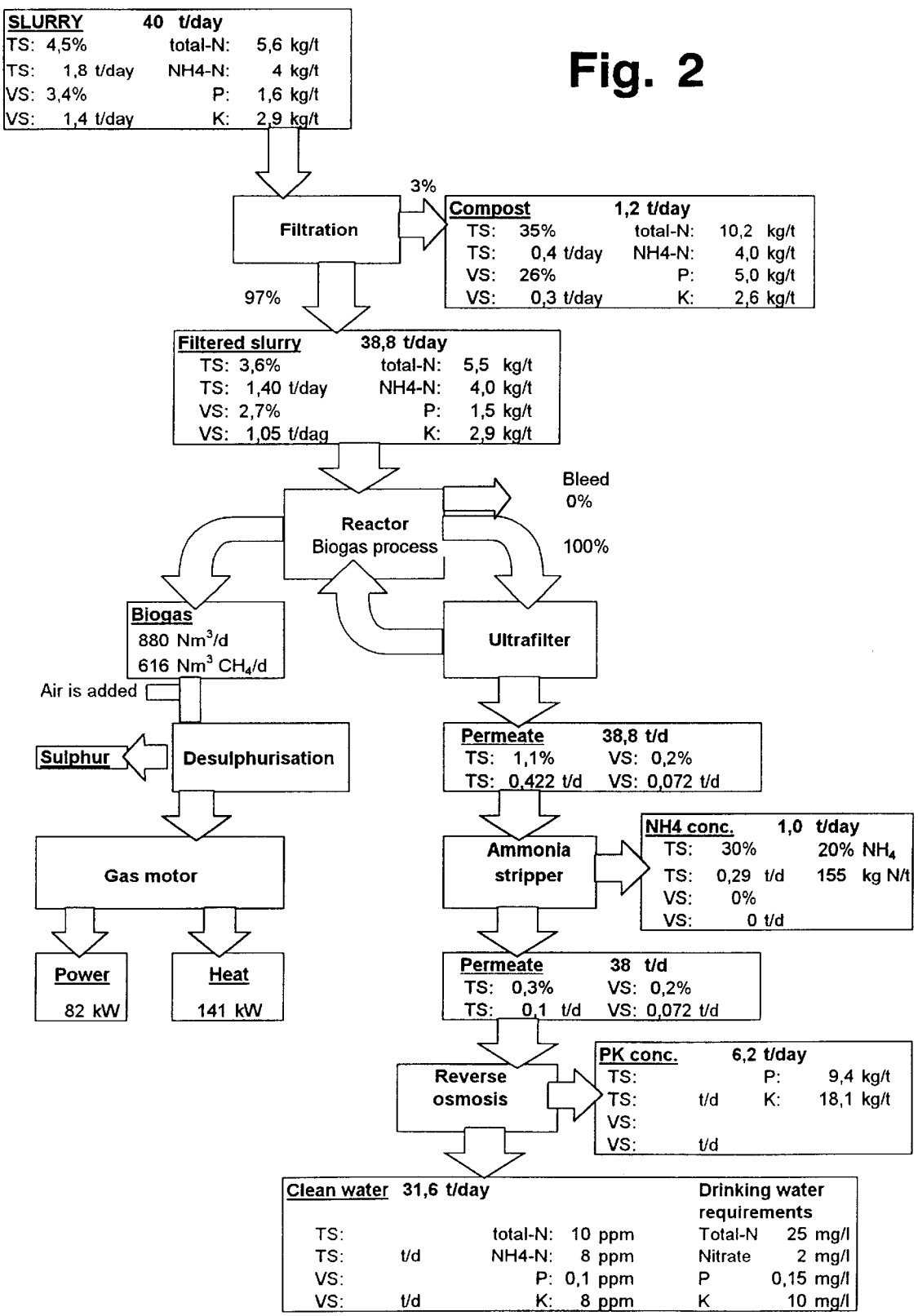
FIG. 2 shows a mass balance diagram for liquid manure treated according to the invention.
Figure 3:
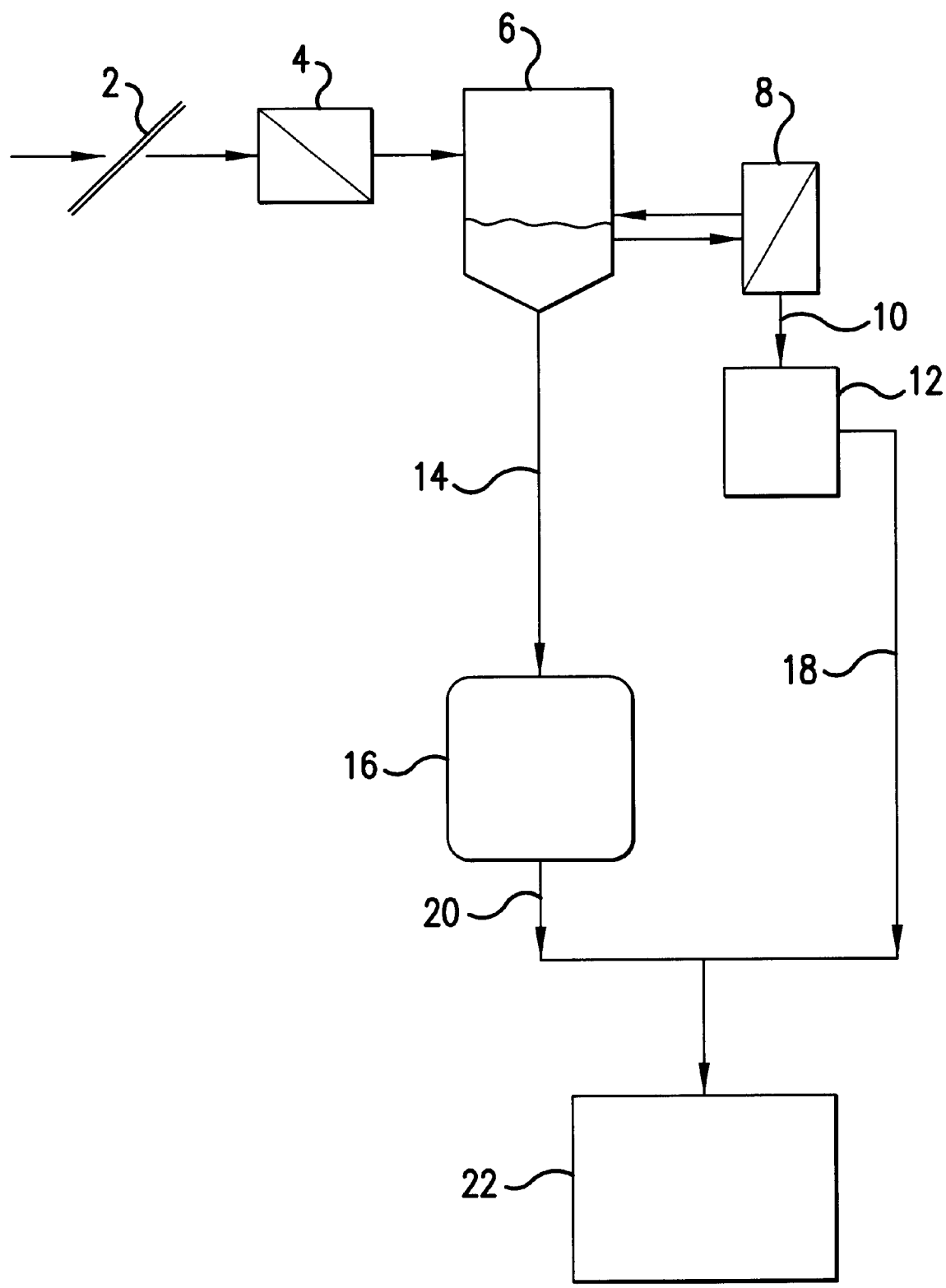
FIG. 3 shows a treatment plant suitable for treating sewage from e.g. households or institutions.

The invention will be further illustrated in the following non-limiting example.

EXAMPLE

A plant as described above and comprising the following components has been in use on a pig farm in Denmark for a period of 6 months:

- a pre-treatment unit for removing fibrous and particulate material greater than 1 mm ("SWEA separator", available from Swea A/S, Denmark)
- a buffer tank,
- a biogas reactor with a volume of about 240 m$^3$, operating at a temperature of about 35–37° C.,
- a desulphurisation unit for removal of hydrogen sulphide from the biogas,
- an ultrafiltration unit employing a tubular ultrafilter with a diameter of 12.5 mm and a cut-off point of about 20,000 Dalton (obtained from Membratek, South Africa), with a flow through the unit of about 50–70 m$^3$/h,
- an ammonia stripper similar to that described in EP 0494154-A, comprising a compression evaporator to result in a reduced pressure of about 0.5 bar and a permeate temperature of about 75–80° C., and
- a spiral reverse osmosis membrane unit arranged in a tapered configuration, with membranes of the polyamide brackish water type.

This treatment plant was used to treat a volume of liquid manure from pigs of about 40 m$^3$/day, the liquid manure having a dry matter content about 6% by weight. The end products of the treatment, per day, are as follows:

- 33 m$^3$ of clean water (fulfils WHO standards for drinking water),
- 1 m$^3$ of ammonia concentrate,
- 5 m$^3$ of fertiliser concentrate containing primarily salts of P and K,
- 1 m$^3$ of fibrous material for compost, and
- 800 m$^3$ of biogas comprising about 75% by weight of methane, the biogas providing about 1520 kWh of power and about 2760 kWh of heat.

What is claimed is:

1. A method for the treatment of an organic waste material in liquid form, comprising:
   (i) subjecting the liquid to anaerobic fermentation in a biogas reactor,
   (ii) separating a substantially sterile and particle-free permeate stream from the biogas reactor by means of a tubular ultrafiltration membrane having a mean molecular weight cut-off of up to about 100,000 Dalton, wherein the separation is performed at a pressure of about 4–6 bar, resulting in a methane-enriched fraction comprising bacteria and suspended organic matter retained by the tubular ultrafiltration membrane,
   (iii) returning said methane-enriched fraction to the biogas reactor to result in a biogas having a methane content of at least about 70% by weight,
   (iv) subjecting the substantially sterile and particle-free permeate stream to treatment with an ammonia stripper to result in an ammonia fraction and a nutrient salt fraction, and
   (v) separating the nutrient salt fraction into a fertilizer concentrate fraction and a water fraction, wherein treatment of the permeate stream with the ammonia stripper is performed at an elevated temperature.

2. The method according to claim 1, wherein the mean molecular weight cut-off is from about 20,000 to about 100,000 Dalton.

3. The method according to claim 1, wherein the mean molecular weight cut-off is from about 10,000 to about 30,000 Dalton.

4. The method according to claim 1, wherein the mean molecular weight cut-off is about 15,000–25,000 Dalton.

5. The method according to claim 1, wherein the mean molecular weight cut-off is about 20,000 Dalton.

6. The method according to claim 1, wherein fibers and particles having a size larger than about 1 mm are separated from the liquid prior to fermentation in the biogas reactor.

7. The method according to claim 1, wherein separation of the nutrient salt fraction into a fertilizer concentrate and a water fraction is performed by means of reverse osmosis.

8. The method according to claim 7, wherein the pH of the nutrient salt fraction is reduced to below about 7.0 prior to the reverse osmosis step.

9. The method according to claim 1, wherein ammonia stripping is performed at a temperature of at least about 40° C.

10. The method according to claim 9, wherein ammonia stripping is performed at a temperature of at least about 50° C.

11. The method according to claim 10, wherein ammonia stripping is performed at a temperature of at least about 60° C.

12. The method according to claim 11, wherein ammonia stripping is performed at a temperature of at least about 70° C.

13. The method according to claim 1, wherein heating of the ammonia stripper is provided from the burning of biogas produced by the biogas reactor.

14. The method according to claim 1, wherein ammonia stripping is performed at reduced pressure.

15. The method according to claim 14, wherein ammonia stripping is performed using a combination of reduced pressure of about 0.25–0.75 bar and a temperature of about 65–85° C.

16. The method according to claim 1, wherein the organic waste material is liquid manure from livestock production.

17. The method according to claim 16, wherein the organic load in the biogas reactor is not more than about 5 kg volatile solids per cubic meter per day.

18. The method according to claim 1, wherein the organic waste material is industrial, agricultural, institutional or household wastewater.

19. A method according to claim 1, wherein the biogas has a methane content of at least about 75% by weight.

20. A method according to claim 1, wherein the biogas has a methane content of about 75–80% by weight.

21. A method according to claim 1, wherein the biogas has a carbon dioxide content of about 20–25% by weight.

22. A plant for treatment of an organic waste material in liquid form, comprising:
  (i) a biogas reactor,
  (ii) a tubular ultrafiltration membrane having a mean molecular weight cut-off of up to about 100,000 Dalton for separating a substantially sterile and particle-free permeate stream from liquid in the biogas reactor and for retaining a methane-enriched fraction comprising bacteria and suspended organic material,
  (iii) a pump for feeding said liquid in the biogas reactor to said tubular ultrafiltration membrane at a pressure of about 4–6 bar,
  (iv) means for returning said methane-enriched fraction comprising bacteria and suspended organic matter retained by the tubular ultrafiltration membrane to the biogas reactor,
  (v) an ammonia stripper for separating the permeate stream into an ammonia fraction and a nutrient salt fraction, and
  (vi) means for separating the nutrient salt fraction into a fertilizer concentrate and a water fraction, wherein the ammonia stripper includes a heating means for heating the permeate stream.

23. The plant according to claim 22, further comprising filter means for separating fibers and particles having a size larger than about 1 mm from a liquid before said liquid enters the biogas reactor.

24. The plant according to claim 22, wherein the means for separating the nutrient salt fraction into a fertilizer concentrate and a water fraction comprises a reverse osmosis unit.

25. The plant according to claim 22, wherein the ammonia stripper further comprises a compressor means for providing reduced pressure.

26. The plant according to claim 22, wherein the heating means employs excess heat from the burning of biogas produced by the biogas reactor.

27. The plant according to claim 22, further comprising means for automatically monitoring the fermentation process and means for automatically regulating the feed of untreated liquid waste into the biogas reactor.

28. The plant according to claim 27, wherein said means for automatically monitoring the fermentation process comprises means for automatically measuring volatile fatty acids, coupled to means for adjusting the organic matter content in the biogas reactor to a desired set-point value based on measured values for volatile fatty acids.

29. The plant according to claim 22, further comprising means for determining the amount of liquid in the reactor, coupled to means for adjusting the amount of liquid in the reactor to a desired set-point value.

30. The plant according to claim 29, wherein the means for determining the amount of liquid in the reactor comprises a pressure gauge located at or near the bottom of the reactor vessel, the pressure gauge being coupled to a valve downstream of the ultrafiltration unit that automatically allows permeate to be returned to the reactor as necessary in order to maintain a desired level of liquid in the reactor.

31. A method for producing biogas enriched in methane, the method comprising subjecting an organic waste material in liquid form to anaerobic fermentation in a biogas reactor, wherein liquid from the biogas reactor is subjected to ultrafiltration performed by using a tubular ultrafiltration membrane having a mean molecular weight cut-off of up to about 100,000 Dalton, wherein the separation is performed at a pressure of about 4–6 bar to result in a permeate fraction enriched in carbon dioxide and a methane-enriched fraction, said methane-enriched fraction being returned to the biogas reactor to result in biogas having a methane content of at least about 70% by weight.

32. The method according to claim 31, wherein the mean molecular weight cut-off is about 10,000–30,000 Dalton.

33. The method according to claim 31, wherein mean molecular weight cut-off is about 15,000–25,000 Dalton.

34. A method according to claim 31, wherein the biogas has a methane content of at least 75% by weight.

35. A method according to claim 31, wherein the biogas has a methane content of about 75–80% by weight.

36. A method according to claim 31, wherein the biogas has a carbon dioxide content of about 20–25% by weight.

37. A method according to claim 31, wherein the mean molecular weight cut-off is from about 20,000 to 100,000 Dalton.

38. A method according to claim 31, wherein the mean molecular weight cut-off is about 20,000 Dalton.

* * * * *